(12) United States Patent
Snider et al.

(10) Patent No.: US 7,427,096 B2
(45) Date of Patent: Sep. 23, 2008

(54) WINDOW ASSEMBLY FOR SCHOOL BUS

(75) Inventors: Darin J. Snider, Holland, MI (US); Michael J. Hulst, Holland, MI (US)

(73) Assignee: Donnelly Corporation, Holland, MI (US)

( * ) Notice: Subject to any disclaimer, the term of this patent is extended or adjusted under 35 U.S.C. 154(b) by 112 days.

(21) Appl. No.: 11/584,698

(22) Filed: Oct. 20, 2006

(65) Prior Publication Data

US 2007/0101668 A1     May 10, 2007

Related U.S. Application Data

(60) Provisional application No. 60/729,434, filed on Oct. 21, 2005.

(51) Int. Cl.
*B60J 1/12* (2006.01)

(52) U.S. Cl. .................. 296/146.16; 49/63; 49/374; 296/200

(58) Field of Classification Search .......... 49/61, 49/63, 372, 374; 52/204.51; 296/146.15, 296/146.16, 178, 193.04, 193.05, 200
See application file for complete search history.

(56) References Cited

U.S. PATENT DOCUMENTS

| | | | | |
|---|---|---|---|---|
| 1,637,367 A | * | 8/1927 | Zimmers et al. ............... 49/440 |
| 2,023,699 A | * | 12/1935 | Robinson ................ 296/146.16 |
| 2,455,462 A | * | 12/1948 | Bader et al. .............. 52/204.51 |
| 2,502,320 A | * | 3/1950 | Guernsey .................... 296/178 |
| 2,762,648 A | | 9/1956 | Huzzard |
| 2,820,992 A | * | 1/1958 | Clayton-Wright ........ 52/204.51 |
| 3,186,755 A | * | 6/1965 | Ward .......................... 296/178 |
| 4,072,338 A | * | 2/1978 | Lawrence et al. ......... 296/190.1 |
| 4,119,341 A | | 10/1978 | Cook |
| 4,364,214 A | | 12/1982 | Morgan et al. |
| 4,364,595 A | | 12/1982 | Morgan et al. |
| 4,431,228 A | * | 2/1984 | Grise .................... 296/100.02 |
| 4,454,688 A | | 6/1984 | Rest et al. ...................... 49/502 |
| 4,604,830 A | | 8/1986 | Maeda et al. ................. 49/374 |
| 4,608,779 A | | 9/1986 | Maeda et al. ................. 49/374 |
| 4,619,479 A | * | 10/1986 | Martin, Jr. ............... 296/190.1 |

(Continued)

FOREIGN PATENT DOCUMENTS

DE        3118559 A1 *  11/1982

(Continued)

*Primary Examiner*—D. Glenn Dayoan
*Assistant Examiner*—Paul A Chenevert
(74) *Attorney, Agent, or Firm*—Van Dyke, Gardner, Linn & Burkhart LLP

(57) ABSTRACT

A window module for a school bus includes a frame, a fixed window panel affixed to a portion of the frame, a perimeter panel secured to another portion of the frame and defining an opening at the other portion of the frame, and a movable window panel. The movable window panel is slidably positioned at the frame such that opposite perimeter edges of the movable window panel are slidably engaged with opposite channel members of the frame. The movable window panel is movable along the channel members and interiorly of the fixed window panel when opened and interiorly of and generally at the perimeter panel when at least partially closed. The exterior surfaces of the fixed window panel and of the perimeter panel form a generally flush surface at an exterior of the school bus when the window assembly is installed at the school bus.

20 Claims, 19 Drawing Sheets

U.S. PATENT DOCUMENTS

| | | | |
|---|---|---|---|
| 4,656,784 A | 4/1987 | Brachmann | 49/491 |
| 4,793,099 A | 12/1988 | Friese et al. | |
| 4,875,307 A | 10/1989 | Barbero | 49/374 |
| 4,932,161 A | 6/1990 | Keys et al. | 49/491 |
| 5,040,333 A | 8/1991 | Mesnel et al. | 49/374 |
| 5,054,242 A | 10/1991 | Keys et al. | 49/491 |
| 5,139,307 A | 8/1992 | Koops et al. | 296/201 |
| 5,169,205 A * | 12/1992 | James | 296/146.16 |
| 5,345,717 A | 9/1994 | Mori et al. | 296/146.16 |
| 5,345,719 A | 9/1994 | Karwande | 49/502 |
| 5,442,880 A * | 8/1995 | Gipson | 49/413 |
| 5,551,197 A | 9/1996 | Repp et al. | 52/204.62 |
| 5,566,510 A | 10/1996 | Hollingshead et al. | 49/479.1 |
| 5,702,148 A | 12/1997 | Vaughan et al. | 296/146.9 |
| 5,704,173 A * | 1/1998 | Repp et al. | 52/204.62 |
| 5,732,509 A | 3/1998 | Buehler et al. | 49/440 |
| 5,743,047 A | 4/1998 | Bonne et al. | 49/490.1 |
| 5,779,956 A | 7/1998 | Hollingshead et al. | 264/138 |
| 5,791,088 A | 8/1998 | Martinelli et al. | 49/375 |
| 5,799,444 A * | 9/1998 | Freimark et al. | 49/413 |
| 5,846,463 A | 12/1998 | Keeney et al. | 264/135 |
| 5,853,895 A | 12/1998 | Lewno | 425/425.6 |
| 5,935,356 A | 8/1999 | Soldner | 156/71 |
| 5,966,874 A * | 10/1999 | Repp et al. | 49/398 |
| 5,996,284 A * | 12/1999 | Freimark et al. | 49/209 |
| 5,996,285 A * | 12/1999 | Guillemet et al. | 49/213 |
| 6,082,674 A * | 7/2000 | White et al. | 244/129.3 |
| 6,128,860 A | 10/2000 | Repp et al. | 49/398 |
| 6,220,650 B1 | 4/2001 | Davis et al. | 296/146.16 |
| 6,286,891 B1 * | 9/2001 | Gage et al. | 296/166 |
| 6,298,606 B1 * | 10/2001 | Repp et al. | 49/506 |
| 6,299,235 B1 | 10/2001 | Davis et al. | 296/146.16 |
| 6,312,043 B1 * | 11/2001 | Blackburn et al. | 296/146.16 |
| 6,389,763 B1 * | 5/2002 | Clauss | 52/204.53 |
| 6,394,529 B2 | 5/2002 | Davis et al. | 296/146.16 |
| 6,425,215 B2 * | 7/2002 | Farrar | 52/204.5 |
| 6,572,176 B2 | 6/2003 | Davis et al. | |
| 6,585,311 B2 * | 7/2003 | Farrar et al. | 296/146.5 |
| 6,591,552 B1 * | 7/2003 | Rasmussen | 49/413 |
| 6,669,267 B1 | 12/2003 | Lynam et al. | |
| 6,685,254 B2 * | 2/2004 | Emmons et al. | 296/178 |
| 6,691,464 B2 * | 2/2004 | Nestell et al. | 49/374 |
| 6,729,031 B2 * | 5/2004 | McKee | 52/204.1 |
| 6,729,674 B2 | 5/2004 | Davis et al. | |
| 6,793,269 B2 * | 9/2004 | Pugh et al. | 296/146.9 |
| 6,830,290 B2 * | 12/2004 | De Gaillard | 296/216.03 |
| 7,003,916 B2 | 2/2006 | Nestell et al. | |
| 7,073,293 B2 * | 7/2006 | Galer | 49/413 |
| 7,097,232 B2 * | 8/2006 | Beaudry et al. | 296/178 |
| 7,146,769 B1 * | 12/2006 | Culverson | 52/204.5 |
| 7,152,906 B1 * | 12/2006 | Farrar et al. | 296/146.15 |
| 7,155,862 B2 * | 1/2007 | Bourque et al. | 49/413 |
| 7,219,470 B2 * | 5/2007 | Lahnala | 49/413 |
| 7,287,802 B2 * | 10/2007 | Dankert et al. | 296/146.16 |
| 7,305,766 B1 * | 12/2007 | Timmermans | 29/897.2 |
| 2002/0117874 A1 * | 8/2002 | Taylor | 296/178 |
| 2003/0137161 A1 * | 7/2003 | Gillen | 296/146.16 |
| 2003/0182865 A1 * | 10/2003 | Nestell et al. | 49/374 |
| 2003/0209922 A1 * | 11/2003 | Emmons et al. | 296/203.01 |
| 2003/0213179 A1 * | 11/2003 | Galer | 49/413 |
| 2004/0020131 A1 | 2/2004 | Galer et al. | |
| 2004/0100121 A1 * | 5/2004 | Bourque et al. | 296/146.16 |
| 2005/0161975 A1 * | 7/2005 | Nieminski et al. | 296/178 |
| 2006/0101738 A1 * | 5/2006 | Lethers et al. | 52/204.51 |
| 2006/0107600 A1 * | 5/2006 | Nestell et al. | 49/413 |
| 2007/0157522 A1 * | 7/2007 | Hebert et al. | 49/413 |

FOREIGN PATENT DOCUMENTS

| | | | | |
|---|---|---|---|---|
| EP | 968862 A2 | * | 1/2000 | |
| FR | 1166064 | | 11/1958 | 296/146.16 |
| JP | 06040251 A | * | 2/1994 | |

* cited by examiner

WINDOW ASSEMBLY FOR SCHOOL BUS

CROSS REFERENCE TO RELATED APPLICATION

The present application claims the benefit of U.S. provisional application, Ser. No. 60/729,434, filed Oct. 21, 2005, which is hereby incorporated herein by reference in its entirety.

FIELD OF THE INVENTION

The present invention relates to windows for vehicles and, more particularly, to window assemblies including window panels and frames for school buses or transit vehicles or the like.

BACKGROUND OF THE INVENTION

School buses typically have a row of multiple window assemblies along the sides of the buses. Such window assemblies typically include a frame that includes four aluminum side frame portions that are screwed or fastened together at the corners of the frame. The window panels, typically one fixed window panel and one movable window panel, are retained within channels along the frame portions while the frame portions are fastened together to form the window assembly. Seals or beads may also be provided around the perimeter edges of the window panels to reduce water intrusion into the bus. The assembly of such window assemblies requires multiple components and is labor intensive. Also, in order to install the window assemblies to the school bus, the window assemblies are attached to an interior portion of the school bus from inside the school bus. Because of the multiple components and the assembly and installation processes, often leakage occurs at the window assemblies.

Therefore, there is a need in the art for a window assembly for a school bus that overcomes the shortcomings of the prior art.

SUMMARY OF THE INVENTION

The present invention provides a window assembly for a vehicle, such as a transit vehicle or school bus, that includes a frame portion and at least one window panel at least partially encapsulated or surrounded by the frame portion. The frame portion is attached to a frame or sheet metal portion of a school bus, and frame portions of multiple window assemblies may be attached adjacent to one another along the sides of the school bus. The window panel or panels may include a fixed window panel and a movable or slidable window panel that slides or moves to open and close an opening in the window assembly.

According to an aspect of the present invention, a window assembly or module for a school bus includes a frame, a fixed window panel and a movable window panel. The frame includes a pair of channel members for movably receiving the movable window panel. The movable panel is slidably positioned at the frame such that a first perimeter edge of the movable window panel is slidably engaged with one of the channel members and a second perimeter edge of the movable window panel is slidably engaged with the other channel member. The fixed window panel may be bonded or adhered or secured to a portion of the frame. A perimeter panel frame or appliqué may be bonded or adhered or secured to another portion of the frame and defines an opening at the other portion of the frame. The movable window panel is movable along the channel members and behind or interiorly of the fixed window panel when opened and generally at the perimeter panel frame when closed or partially closed. The outer surfaces of the fixed window panel and of the perimeter panel frame form a generally flush surface at an exterior of the school bus when the window assembly is installed at the school bus.

A resilient seal is included along the channel members to reduce air and/or water leakage between the window panel and the frame. A sliding resilient seal may be bonded or adhered or secured to the interior surface of the fixed window panel and at a perimeter region of the fixed window panel that is at or near the opening defined by the perimeter panel for slidably engaging the exterior surface of the movable window panel as the movable window panel is opened and closed.

The window assembly may be configured to be installed at the exterior sheet metal of the school bus and from a location outside of the school bus. Multiple window assemblies may be installed along the side of the school bus.

Optionally, the window panel may include two movable window panels that are slidably movable along the frames, and that may be horizontally slidable, such as for a driver's window of a school bus, or the window panel may include a single fixed window panel bonded or adhered to a perimeter frame, or the window assembly may comprise other types of windows and frame configurations or arrangements while staying within the spirit and scope of the present invention.

According to another aspect of the present invention, a method of installing a window module at a vehicle includes providing a window module comprising a frame, a fixed window panel having an interior surface and an exterior surface, a perimeter panel having an interior surface and an exterior surface, and a movable window panel having an interior surface and an exterior surface. The fixed window panel is affixed to a portion of the frame, and the perimeter panel is secured to another portion of the frame and comprises perimeter portions that cooperate to define an opening at the other portion of the frame. The movable window panel is slidably positioned at the frame such that a first perimeter edge of the movable window panel is slidably engaged with a first channel member of the frame, and a second perimeter edge of the movable window panel is slidably engaged with a second channel member of the frame. The movable window panel is movable along the channel members and interiorly of the fixed window panel when opened and interiorly of and generally at the perimeter panel when at least partially closed. The window module is attached to a sheet metal frame of the vehicle, such as a school bus, from outside of the vehicle, with the window module engaging and attaching to an exterior surface of the sheet metal frame of the vehicle when attached from the outside of the vehicle. The exterior surfaces of the fixed window panel and of the perimeter panel form a generally flush exterior surface at an exterior of the vehicle when the window assembly is attached at the exterior surface of the sheet metal frame of the vehicle.

Therefore, the present invention provides a window assembly for a transit vehicle or bus or school bus that may be readily installed at the school bus and that may provide an enhanced, substantially flush-like appearance at the exterior of the school bus. Because the frame may be molded or extruded and sonic welded or otherwise joined together, the window assembly may include fewer parts and fewer fasteners as compared to conventional school bus windows, which may reduce the complexity and cost of the school bus window assembly, while providing improved performance and reduced leakage.

These and other objects, advantages, purposes and features of the present invention will become apparent upon review of the following specification in conjunction with the drawings.

DESCRIPTION OF THE PREFERRED EMBODIMENTS

Figure 1:
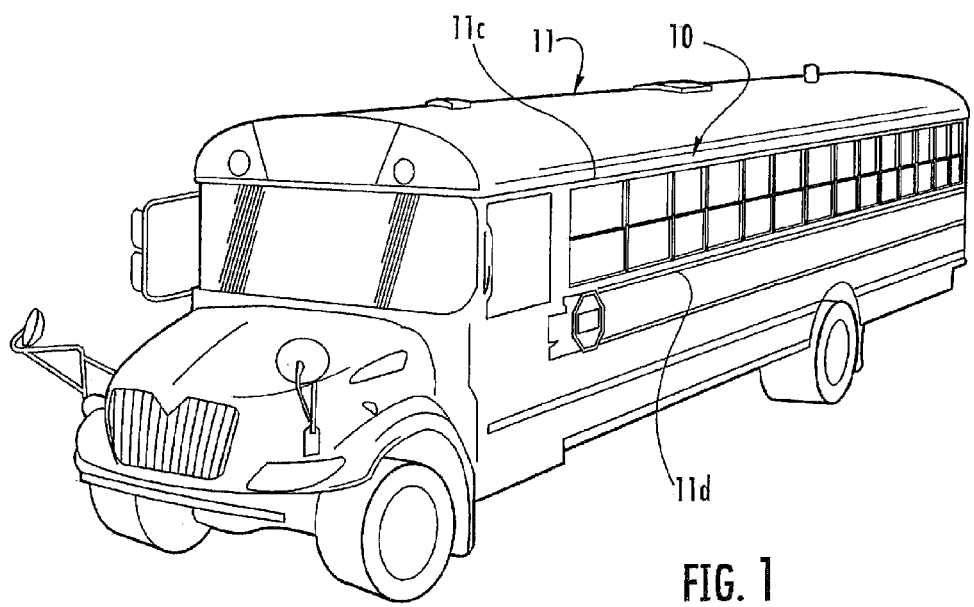
FIG. 1 is a perspective view of a school bus incorporating a plurality of window assemblies in accordance with the present invention.
Figure 2:
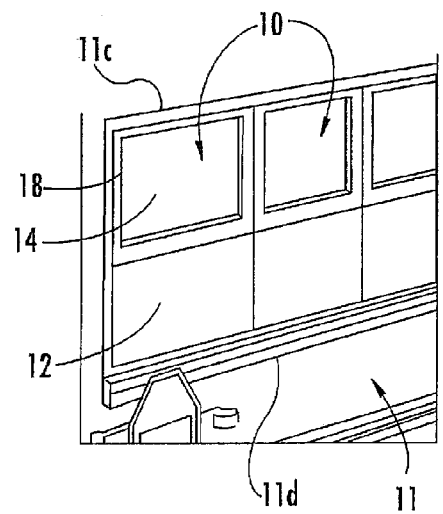
FIG. 2 is an enlarged perspective view of a portion of the school bus of FIG. 1.

Referring now to the drawings and the illustrative embodiments depicted therein, a window assembly 10 may be mounted at an opening of a transit vehicle, such as a school bus 11 or the like (FIGS. 1 and 2). Window assembly 10 comprises a modular window assembly that includes a fixed window pane or panel 12 fixedly attached to a perimeter frame 16, and a movable or slidable window pane or panel 14 that slides or moves along perimeter frame 16, and that moves generally vertically relative to the fixed window panel 12 to open and close the window assembly, as discussed below. A perimeter panel or perimeter frame panel 18 is preferably adhered or bonded or secured or otherwise attached to a portion of the perimeter frame 16 to provide a perimeter pane or panel portion at least partially around an opening for the movable window panel 14 that is generally flush with the fixed window panel 12, as discussed below. The perimeter panel 18 provides a panel around the perimeter of the opening for the movable window panel 14 with an opening at a central region of the perimeter panel so that the window is "open" when the movable window is moved toward the fixed window panel 12, as also discussed below.

In the illustrated embodiment, the window assembly module is attached to the sheet metal or body of the school bus via a strip or bead of adhesive, such as a butyl sticky rope or the like, along the perimeter frame, and with studs for additional attachment spaced along the perimeter frame of the window assembly. The adhesive "rope" or strip may be located along the mounting surface of the perimeter frame and may be sandwiched between the metal frame or body of the school bus and the perimeter frame as the window assembly is pressed against the school bus body to install/attach the window assembly to the school bus. Optionally, the window assembly may be directly bonded to the body of the school bus by an adhesive, such as a urethane adhesive, including one part or two part urethane adhesive, an epoxy adhesive, an acrylic adhesive, a silicone adhesive, a polyvinylbutyral adhesive, or the like. For example, the window assembly may be bonded to the school bus by a bead of adhesive that is located between the exterior surface of the school bus body panel or sheet metal and the interior surfaces of the perimeter frame so as to provide a substantially flush mounting of the window assembly at the school bus. As used herein, "flush mounting", in reference to the position of the window assembly at the school bus body, means that at least the fixed window/perimeter panels appear to lie in substantially the same plane as the exterior surface of the school bus body or, in the case of a curved school bus body, lie in the curved plane of the school bus body and generally follows the contours of the school bus body. The window assembly may include one or more locating clips (not shown) positioned around and attached to or bonded to the perimeter of the window panels and of the window assembly to facilitate proper positioning of the window assembly at the opening in the side of the school bus.

When movable window panel 14 is moved to its closed position at the opening of the window assembly, movable window panel 14 is offset inwardly from the plane of the fixed window panel 12 and the perimeter frame panel 18 to form a "sub-flush" mounting arrangement for movable window panel 14 with respect to fixed window panel 12 and perimeter frame panel 18. As used above, the term "inwardly" refers to the relative position, for example, of the movable window panel with respect to the fixed window and perimeter panel when the window assembly is mounted at the school bus. Similarly, references to "inner", "outer", "interior" and "exterior" are used as nomenclature relative to when the window assembly when mounted at the school bus.

As shown in FIGS. 1 and 2, a plurality of window assemblies or modules 10 may be installed along the side of the school bus. The window assemblies are closely spaced next to one another and provide a substantially continuous, flush row of window panels along the sides of the school bus. The window assemblies are mounted to the generally vertical rails or bows 11a or bow caps 11b of the school bus 11, and are positioned generally below the drip rail or header 11c of the school bus 11 and at or above the rub rail 11d of the school bus 11.

Figure 3:
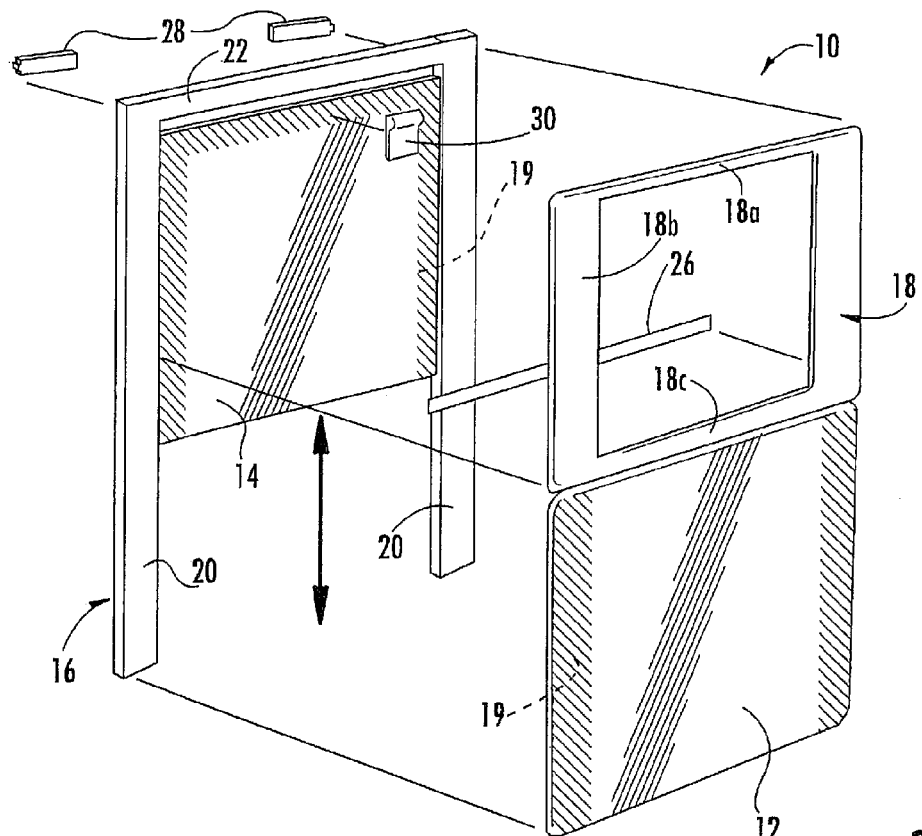
FIG. 3 is an exploded perspective view of a window assembly of the present invention.
Figure 4:
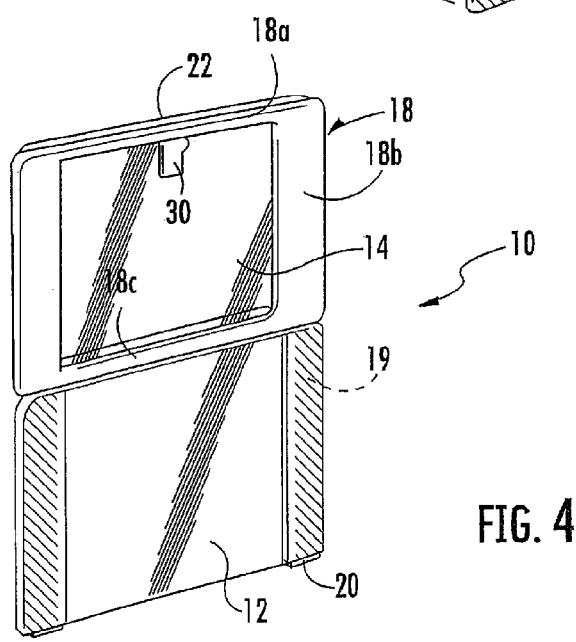
FIG. 4 is a perspective view of the window assembly of FIG. 3, shown assembled.
Figure 7:
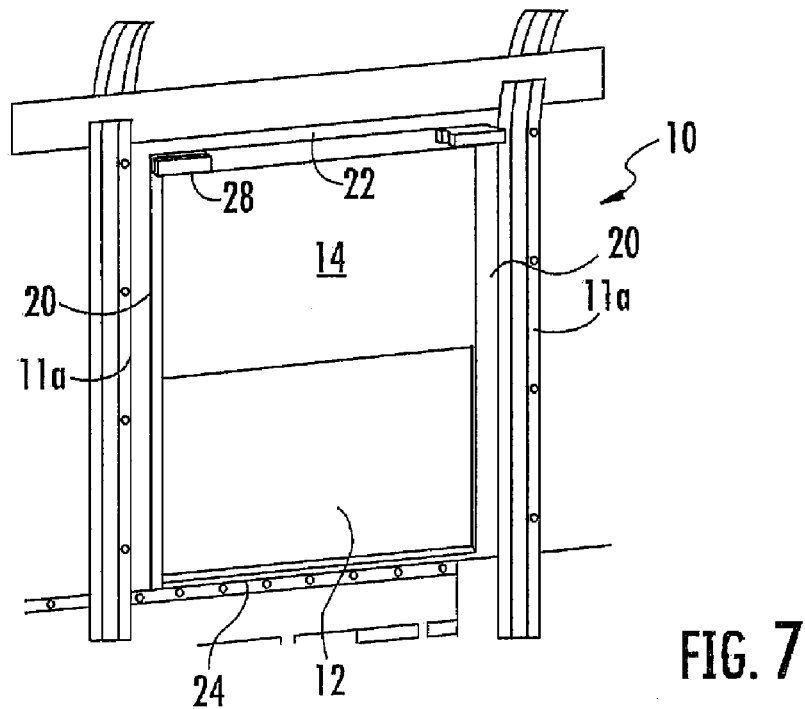
FIG. 7 is an interior view of the window assembly of FIG. 6.

As shown in FIGS. 3 and 4, perimeter frame 16 includes a pair of generally vertical channel members or side frame members 20 and a generally horizontal upper channel or frame member 22. Although not shown in FIGS. 3 and 4, perimeter frame 16 may also include a lower generally horizontal perimeter frame member (such as frame member 24 shown in FIGS. 7 and 9 and discussed below). The frame members may be formed of any suitable material, and may be molded or extruded to the desired form (if each member is extruded, the ends of adjacent members may be joined together, such as via ultrasonic welding or bonding or the like). For example, the perimeter frame may comprise a substantially rigid material, such as a substantially rigid polymeric or plastic material, such as glass filled nylon, PVC, polyethylene terephthalate (PET), polypropylene, nylon, acrylonitrile-butadeine-styrene (ABS) or thermoplastic urethane (TPU) or the like. The perimeter frame may also or otherwise comprise a metallic material or may comprise a composite material, such as a filled polymeric or a metal member that is encapsulated in plastic, for example.

The frame members may slidably or movably support the movable window panel 14, and may provide an outer surface for adhering or bonding or attaching the fixed window panel 12 and the perimeter panel 18 to the perimeter frame 16. As shown in FIG. 3, the perimeter panel or panels 18 (the perimeter panel may comprise a unitary construction, such as shown in FIGS. 3 and 4, or may comprise separate perimeter panel portions, such as an upper portion, a lower portion, and/or opposite side portions, while remaining within the spirit and scope of the present invention) may comprise one or more elongated strips or panels that form a generally rectangular shaped perimeter panel and that defines a generally rectangular opening at its center region of the perimeter panel or panels 18. The perimeter panel 18 is attachable (such as via bonding via an adhesive layer or the like) to the exterior surface or portion of the upper frame member 22 and the exterior or outer surfaces or portions of the upper portions of the side frame members 20 (such as at the side frame members above the fixed window panel). When attached to the perimeter frame, the exterior surface/surfaces of the perimeter panel or panels or appliqué may be generally flush with the exterior surface of the lower fixed window panel 12. Optionally, it is envisioned that the perimeter panel or panels or exterior frame portion may be molded as part of the perimeter frame. The perimeter panel or appliqué may comprise glass or may comprise a polymeric or plastic material, and may be darkened or tinted or coated, such as a dark or black polycarbonate hard coated panel or the like.

The fixed window panel 12 is likewise a generally rectangular shaped panel and is attachable to the exterior portion of the lower portions of the side frame members 20 and to the lower frame member 24. The fixed window panel 12 is generally adjacent to the perimeter panel 18 and, in the illustrated embodiment, is below the perimeter panel 18 to provide a lower, fixed window panel of the window assembly. The fixed window panel may be bonded or adhered to the lower portion (or other suitable portion depending on the particular application of the window assembly) of the perimeter frame via any suitable adhesive or bonding material. For example, an adhesive layer or bead may be located around the perimeter frame or at the mating perimeter surface of the fixed window panel and sandwiched between the fixed window panel and the perimeter frame to adhere or affix the fixed window panel to the perimeter frame of the window assembly. The fixed window panel, movable window panel and perimeter panel or panels may comprise any suitable material, such as glass or polycarbonate panels or substrates or the like, without affecting the scope of the present invention. Optionally, the fixed window panel 12 and/or the perimeter panel 18 may have a darkened or black frit layer 19 or the like around their perimeter regions to substantially conceal the perimeter frame and limit viewability of the perimeter frame through the window panels and from the outside of the school bus.

Figure 10:
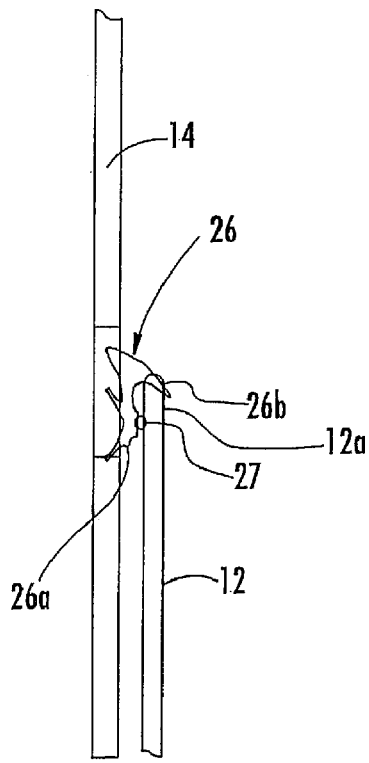

A center seal or sliding seal or weather seal 26 (FIGS. 3 and 10) may be bonded or adhered (such as via an adhesive layer or bead or strip 27) or otherwise attached or secured to an interior surface of the fixed window panel 12 or an interior surface of a lower panel or section 18c of perimeter panel 18. The sliding seal 26 includes a sliding portion or sealing portion 26a that slidably engages the exterior surface of the movable window panel 14 as the movable window panel moves between its open and closed positions. Sliding seal 26 may comprise a soft elastomeric or rubber-like material, and may comprise any type of seal, such as a Y-type seal (as shown in FIG. 10), or other types of seals, without affecting the scope of the present invention. In the illustrated embodiment of FIG. 10, the sliding seal 26 is bonded along an interior surface of an upper perimeter region 12a of fixed window panel 12 and may include a lip 26b that extends over the upper perimeter edge of the fixed window panel to limit or substantially preclude water intrusion or the like between the fixed window panel and the sliding seal 26. The center or sliding seal 26 may be affixed or attached to the fixed window panel via any attachment means, such as via bonding, taping or mechanical attachment, such as via a metallic or polymeric carrier, and may include a portion of the seal (or via a carrier if applicable) hooking over the upper fixed window panel edge to assist in retaining the seal at the upper perimeter region of the fixed window panel. For example, a center or sliding seal may be disposed along a carrier (not shown), such as a metallic or polymeric carrier or member, which is attached to the side frame members and/or to the fixed window panel at an upper portion of the fixed window panel, such as via adhesive or the like, and/or such as a hooking portion of the carrier overlapping and wrapping at least partially over and around the upper perimeter edge of the fixed window panel. Optionally, the sliding seal or carrier may be adhered to or bonded to or otherwise attached to the interior surface of the lower perimeter portion 18c of the perimeter panel, such as in a similar manner as described above.

Figure 5:
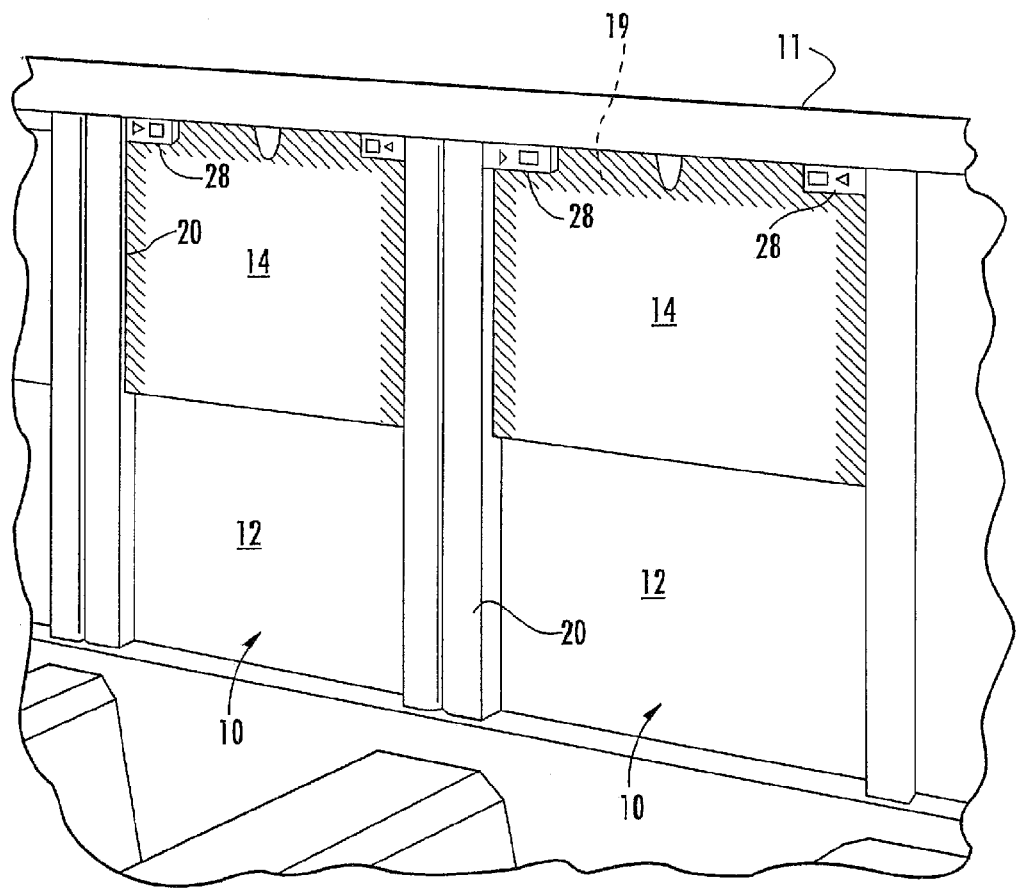
FIG. 5 is an interior perspective view of window assemblies of the present invention as installed at a school bus.
Figure 6:
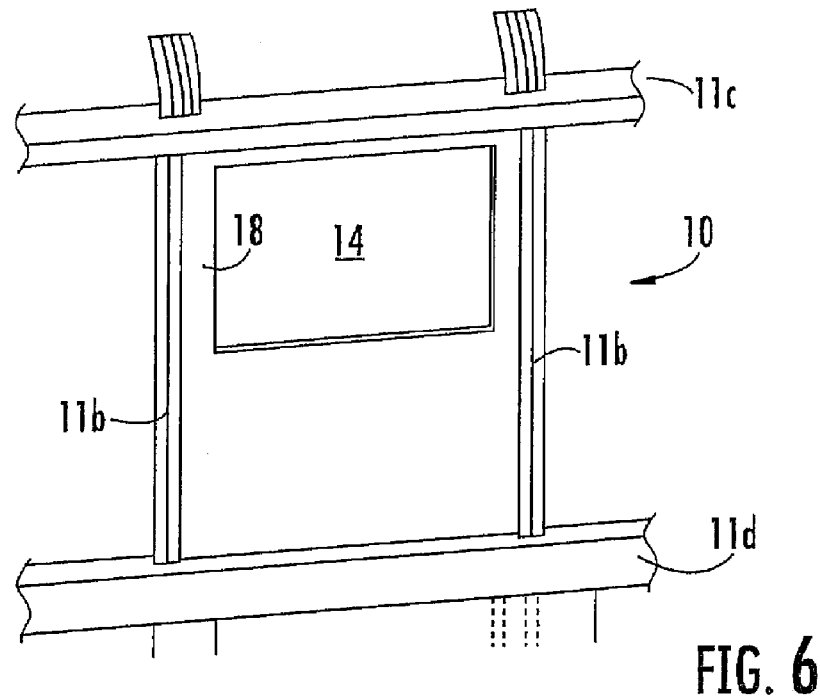
FIG. 6 is an exterior view of a window assembly of the present invention.

As shown in FIGS. 3 and 4, window assembly 10 may also include locking devices or height adjustment latches 28, which function to release and engage the side channel frame members 20 or a vertical rail of the school bus to allow for selective movement and locking of the movable window panel along the side frame members 20, such as in any manner generally known in the school bus window art. The locking devices 28 may be bonded or adhered or otherwise secured to the interior surface of the movable window panel 14, such as at the upper corners of the movable window panel 14, and may be located within the region covered or concealed by the frit layer 19 (as can be seen in FIG. 5). Window assembly 10 may also include an exterior "broom cup" or closure assist element 30, which may be bonded or adhered to the exterior surface of the movable window panel 14, such as at a generally upper perimeter region of the movable window panel 14.

The panels may be bonded to the perimeter frame, and the latching devices and/or seals and other components may be bonded to the window panels, such as via curing of a bonding or an adhesive material and utilizing bonding processes of the types described in U.S. Pat. Nos. 6,298,606; 6,128,860; 5,966,874; 5,704,173; and 5,551,197, which are hereby incorporated herein by reference in their entireties. For example, the fixed window panel may be bonded to the lower portion of the perimeter frame by an adhesive, such as a urethane adhesive, including a one part or two part urethane adhesive, an epoxy adhesive, an acrylic adhesive, a polyvinylbutyral adhesive, a silicone adhesive, or the like. Reference is made to U.S. Pat. Nos. 4,364,214; 4,364,595; 6,299,255; and 6,220,650, which are incorporated by reference in their entireties, for examples of suitable adhesives. Optionally, and desirably, the frit layer at the window panel and/or perimeter panel may be substantially opaque (such as a dark color or black) and, therefore, provides a concealing function and may further facilitate the adhesion or bonding of the fixed panels to the perimeter frame.

Figure 8:
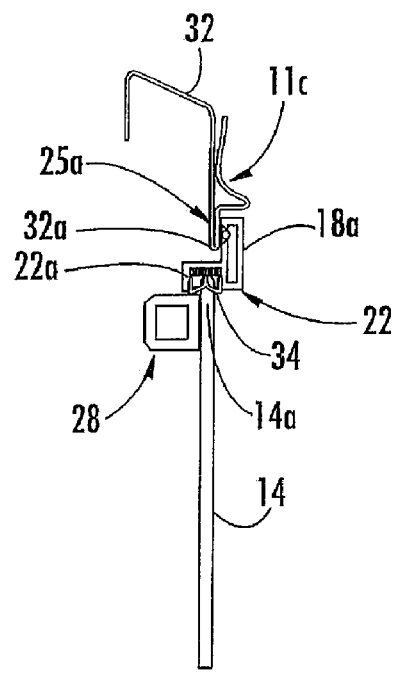
FIGS. 8-12 are sectional views of the window assembly of FIGS. 6 and 7.

As shown in FIG. 8, upper frame member 22 may be bonded or adhered (and/or screwed or otherwise fastened), such as via an adhesive layer 25a or butyl bead or the like, to the sheet metal 32 of school bus 11, such as to a generally planar lip 32a of the sheet metal, which is below and near the drip rail or header 11c of the school bus. The upper frame member 22 defines a receiving channel 22a therealong for receiving an upper perimeter edge 14a of movable window panel 14 therein when movable window panel 14 is closed. A flexible and/or compressible seal 34 is positioned along the receiving channel 22a to substantially seal against the upper perimeter edge 14a of movable window panel 14 when the movable window panel 14 is partially or fully closed or raised, such as shown in FIG. 8. As also shown in FIG. 8, upper frame member 22 may have the upper portion 18a of the perimeter frame or panel molded with or as part of the upper frame member, so as to provide a unitary frame and perimeter panel along the upper portion of the window assembly or module. Optionally, the upper frame member may have a substantially planar exterior surface at which the upper portion of the perimeter panel or frame may be bonded or otherwise attached, such as can be seen with reference to FIG. 3.

Figure 9:
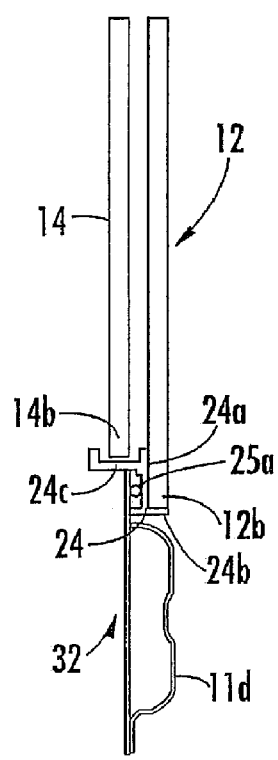

As shown in FIG. 9, the lower frame member 24 is bonded or adhered (such as via adhesive layer 25a) or otherwise fastened or attached to the sheet metal 32 of school bus 11, such as at or over or on a flange or lip of the rub rail 11d of the school bus 11. The fixed window panel 12 is bonded or adhered to an outer surface 24a of the lower frame member 24, which may include a lower perimeter lip 24b along the lower perimeter edge 12b of the fixed window panel 12. The lower frame member 24 may include a channel or receiving portion 24c at an inner or interior side of the frame member for receiving a lower perimeter edge 14b of movable window panel 14 when the movable window panel is fully opened or lowered. Optionally, the window assembly may include another type of stop element that limits downward movement of the movable window panel so that the movable window panel does not fully lower to the receiving portion 24c of lower frame member 24.

Figure 11:
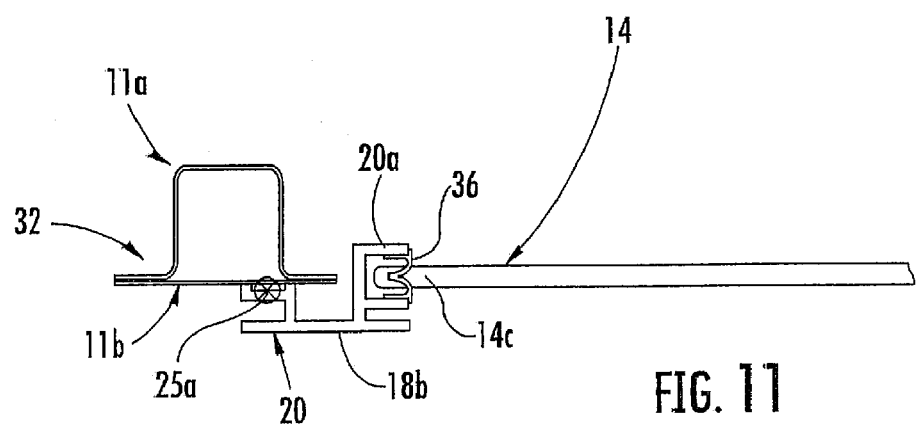

As shown in FIG. 11, the side frame members 20 may be bonded or adhered (such as via adhesive layer 25a) or otherwise fastened to the sheet metal or frame 32 of the school bus, such as to or at the bow caps 11b of the school bus 11. The side frame members 20 include channel portions 20a for slidably receiving the side perimeter edges 14c of movable window panel 14 therein. The channel portions 20a may include a sliding seal portion or strip or member 36 therealong to substantially seal against the edges 14c of movable window panel 14. As shown in FIG. 11, the side frame members 20 may have the side perimeter rail or perimeter panel portion 18b of the perimeter frame or panel formed or molded as part of the side frame members at an upper portion of the side frame members (or alternately, the side frame members may have an exterior surface for bonding or attaching the side perimeter panels or portions of the perimeter panel thereat), while the lower portion (such as shown in FIG. 12) of the side frame members may have an outer or exterior surface at which the fixed window panel may be bonded or adhered or otherwise attached.

Figure 12:
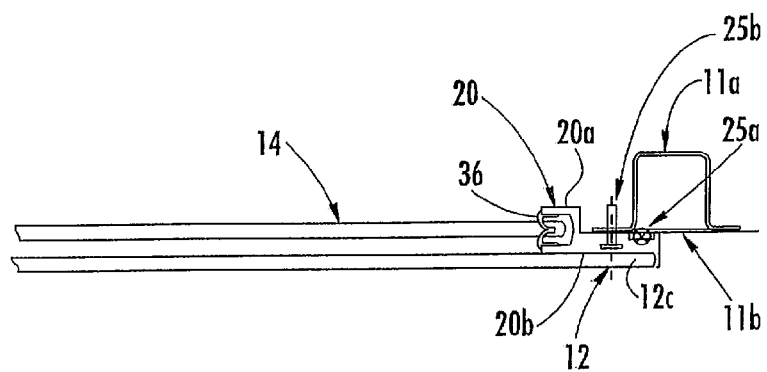

For example, and as shown in FIG. 12, the side frame members 20 may have an outer surface 20b for receiving and bonding the side perimeter edges 12c of fixed window panel 12 (such as fixed laminated glass or the like) thereto. In the illustrated embodiment of FIG. 12, the side frame member 20 includes a stud 25b for securing the side frame member to the bow cap 11b of the school bus 11. Although not shown in FIGS. 11 and 12, the side frame members 20 may have an outer surface along the upper portions and along which the perimeter frame panel 18 is bonded or attached. Also, at a lower or bottom portion of the side frame members 20, the side frame members may not include the channel for the movable window, depending on the range of travel of the movable window along the side frame members.

The seals along the channels of the perimeter frame may comprise generally U-shaped seals or double-L seals, Y seals, V seals, C-shaped seals, bulbous seals, or other different shaped-seals, and preferably comprise a polypropylene material (PPE) or EPDM. Examples of suitable seals and seal materials can be found in U.S. Pat. Nos. 6,220,650; 6,299,235; 6,394,529; 6,572,176; and 6,729,674, which are incorporated by reference herein in their entireties. The seals may comprise a "rope" type seal that may be positioned along each of the upper and side channels, and may comprise a continuous seal along the three channels, whereby the seal may substantially seal against the side and upper perimeter edges of the movable window panel when the movable window panel is received in the channels of the frame members.

The sliding seal 26 at the fixed window panel may comprise an extruded EPDM material or the like, and may be adhered to the inner surfaces of the fixed panels, such as via a pressure sensitive tape or the like. The seal may provide a generally horizontal seal across the upper portion of the fixed window panel and at the opening of the window assembly to seal against the movable window panel. The sliding seal may comprise Y-shaped seals or bulbous seals or one or more of the various other shaped seals noted above, without affecting the scope of the present invention. Reference is made to U.S. patent application Ser. No. 10/113,056, filed Apr. 1, 2002, entitled HORIZONTAL SLIDER WINDOW ASSEMBLY, by Nestell et al., now U.S. Pat. No. 7,003,916, which is hereby incorporated herein by reference in its entirety. Alternately, as described in the referenced pending application, the seal or seals may be injection molded, such as, for example, from SANTOPRENE® brand polymeric material available from Monsanto Corporation, or formed from other materials, including EPDM and thermoplastic elastomers.

Because the perimeter frame of the window module or assembly can be adhered to or bonded to the exterior surface of the school bus, the window module or assembly can be installed at the sheet metal or frame of the school bus from outside the school bus, and without the use of fasteners and the like being secured at the interior of the school bus. For example, and as can be seen with reference to FIGS. 8, 9, 11 and 12, the window module or assembly may be adhered to the sheet metal 32 of the school bus without the need for additional trim elements at the exterior of the school bus and without having to engage an inner surface or inwardly facing surface of the sheet metal or frame of the school bus. The upper frame portion is adhered to the vehicle sheet metal and generally beneath the drip rail, while the lower frame portion is adhered to the vehicle sheet metal and generally above the rub rail of the school bus. The side frame portions are adhered to the sheet metal and generally at the bows/bow caps of the school bus. Although the side rails do not appear in FIGS. 11 and 12 to provide a flush outer surface with the vehicle sheet metal a the bows/bow caps, it is important to note that when multiple window assemblies or modules are mounted along the side of the vehicle or school bus, the side rails of adjacent window modules will be adjacent to one another and may abut one another so as to provide a substantially flush exterior surface of the window assemblies or modules that is substantially flush with the vehicle sheet metal above and below the window assemblies or modules. Also, although a fastener is shown in FIG. 12, such a fastener may not be required to secure the window assembly or module at the side of the school bus, or the fastener may be selected to be of a type that does not require a female fastener to be threaded thereon from the inside of the vehicle or school bus, so that the window assemblies or modules may be installed at the side of the school bus from outside of the school bus.

In the illustrated embodiment of FIGS. 1-12, window assembly or module 10 is configured as a split sash window with a vertically movable window panel, and with the perimeter panel or appliqué located above the fixed window panel of the window assembly or module. However, aspects of the window assembly or module of the present invention may be equally suited for other applications, such as a horizontally movable window panel (such as typically used as a driver's window) or a fixed sash type window panel or the like.

Figure 13:
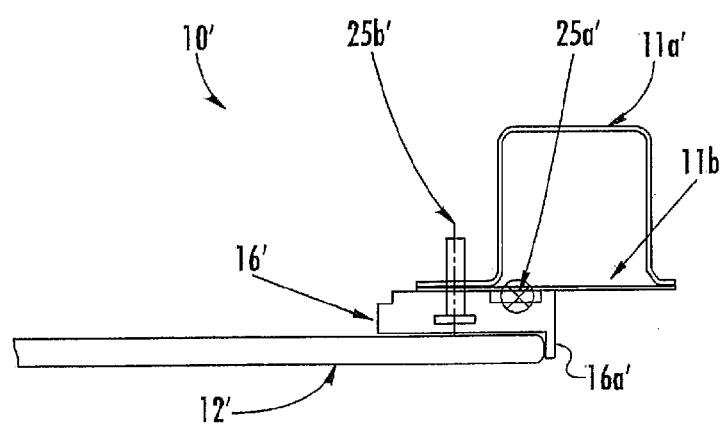
FIGS. 13-15 are sectional views of a fixed sash window assembly of the present invention.
Figure 14:
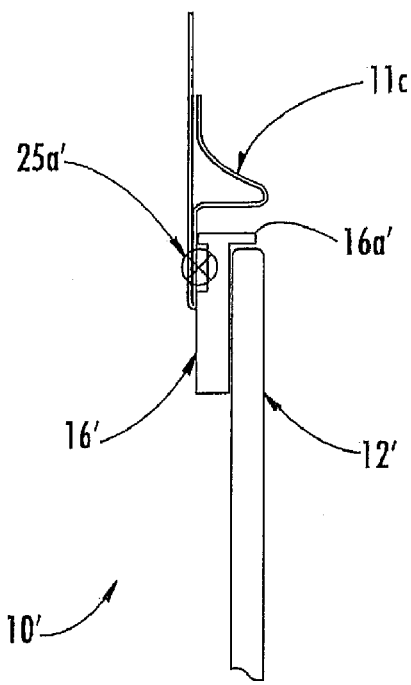
Figure 15:
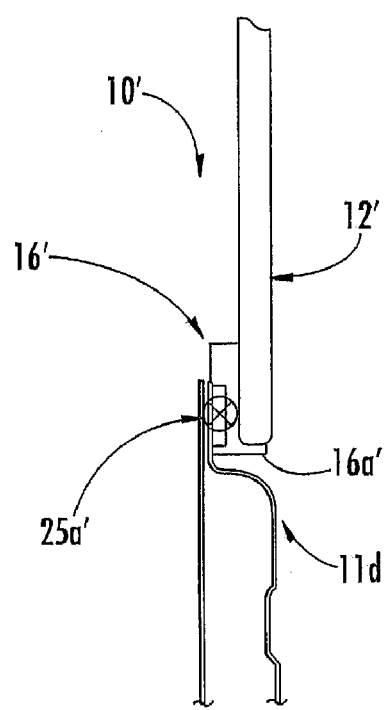

For example, and as shown in FIGS. 13-15, a window assembly or module 10' includes a fixed window panel 12' and a perimeter frame 16' that is attachable to the sheet metal of a school bus (and preferably from the outside of the school bus), such as via an adhesive layer 25a' and/or studs or fasteners 25b'. The perimeter frame or ring 16' is substantially similar for each frame portion or member, and may include a perimeter lip 16a' protruding outwardly along the perimeter of the fixed window panel 12'. Because the perimeter frame 16' is substantially similar in each view, a detailed discussion is not needed for each of the side frame members (FIG. 13), upper frame member (FIG. 14) and lower frame member (FIG. 15) of the perimeter frame 16'. Similar to the window assemblies or modules 10 described above, the window assemblies or modules 10' may be mounted to the sheet metal or frame of the vehicle from outside the school bus and may provide a substantially or generally flush appearance of the window assemblies or modules along the side of the school bus.

Figure 18:
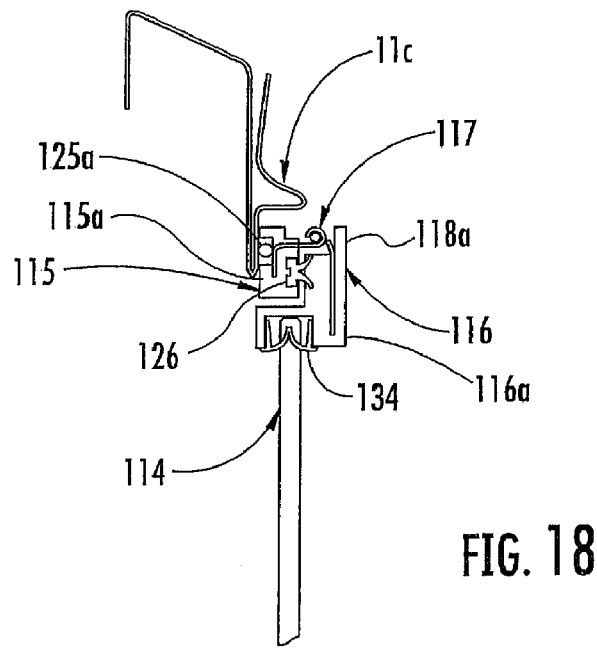
FIGS. 18-20 are sectional views of the window assemblies of FIGS. 16 and 17.
Figure 19:
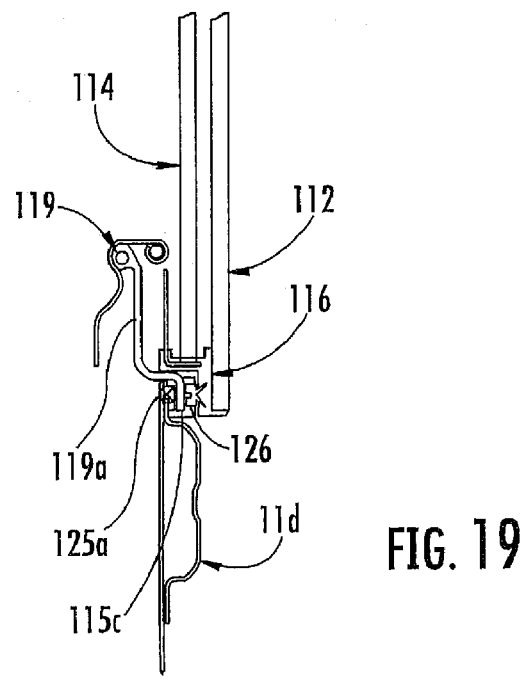

Optionally, a window assembly of the present invention may comprise a split sash window assembly (such as similar to window assembly 10 described above), and may be hinged so that the window panels may pivot about a hinge, such as a generally horizontal hinge or a generally vertical hinge. For example, and with reference to FIGS. 16, 18 and 19, a window assembly 110 may be mounted or attached to a school bus and may include a mounting or base perimeter frame 115 and a window receiving or pivotable perimeter frame 116. As can be seen in FIGS. 18 and 19, base perimeter frame 115 may be bonded or adhered (such as via an adhesive layer or bead 125a or the like) or otherwise fastened to the sheet metal of the school bus, such as in a similar manner as perimeter frame 16 described above, while pivotable perimeter frame 116 is pivotally or hingedly attached to the base perimeter frame 115 via a hinge or pivot device 117 (FIG. 18). The window assembly 110 includes a handle or grasping element or releasing element 119 for releasing a latch at the frame portions opposite the hinge 117 to allow the pivotable perimeter frame 116 to pivot relative to base perimeter frame 115 about the pivot axis of the hinge 117.

Figure 16:
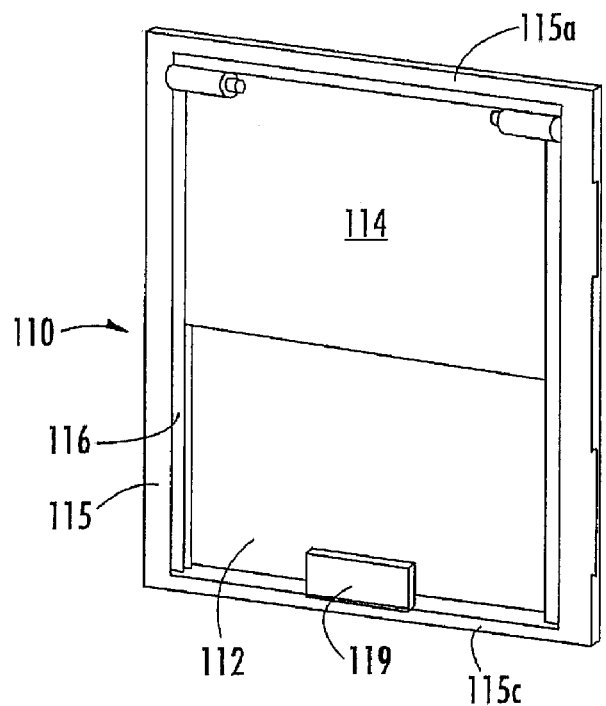
FIGS. 16 and 17 are perspective views of window assemblies of the present invention that may pivot outward to open.
Figure 17:
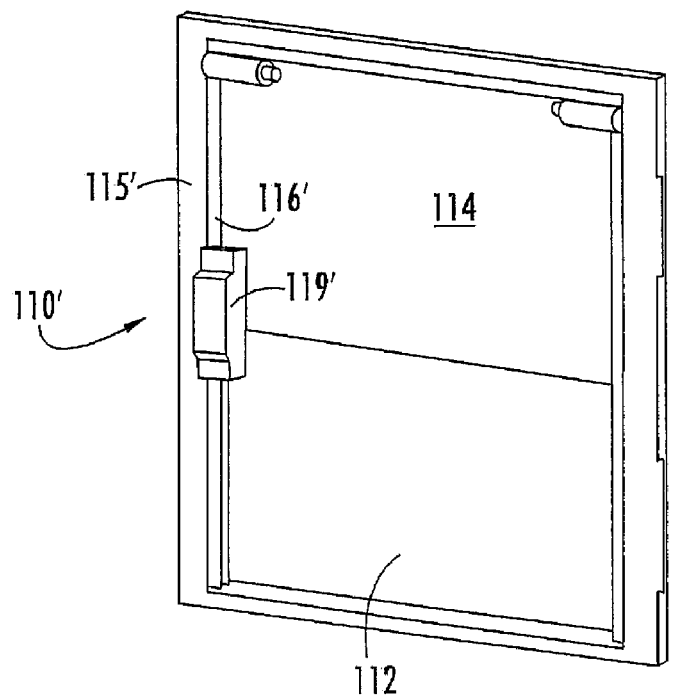
Figure 20:
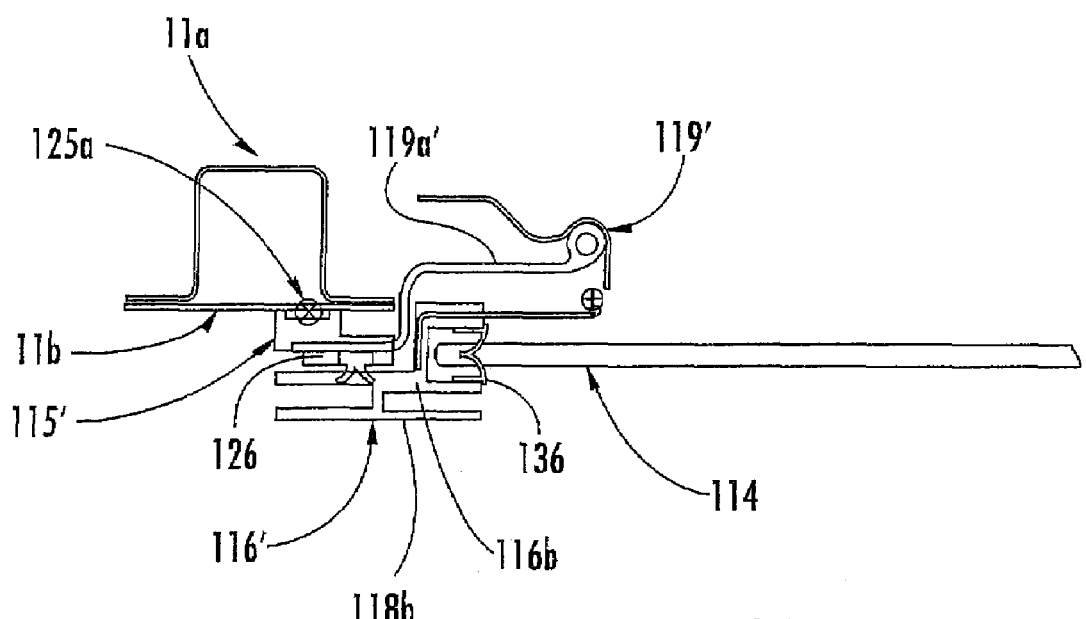
Figure 21:
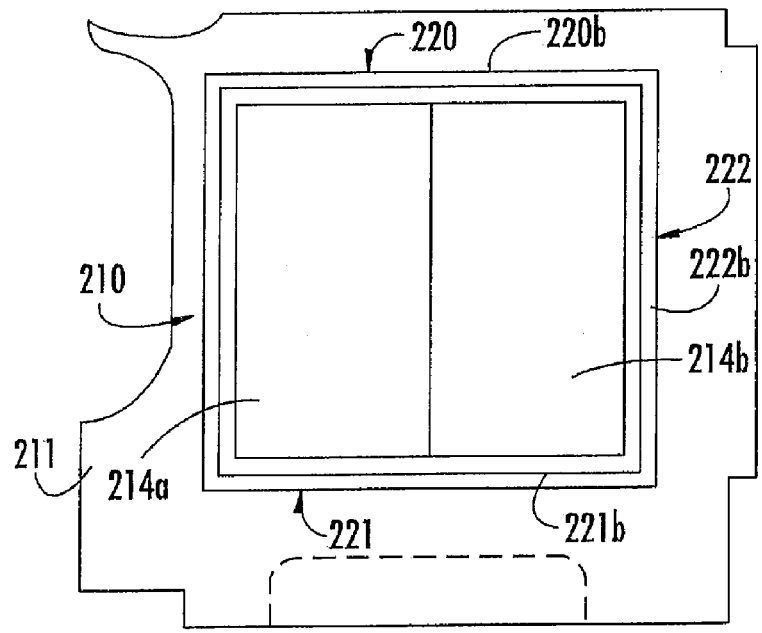
FIG. 21 is an exterior view of a driver side window assembly of the present invention.
Figure 22:
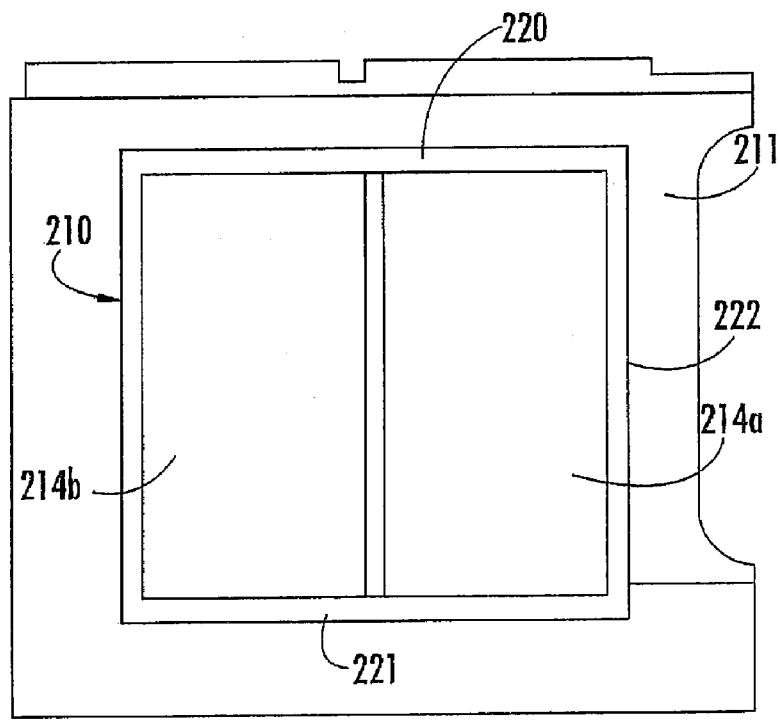
FIG. 22 is an interior view of the driver side window assembly of FIG. 21.

In the illustrated embodiment of FIGS. 16, 18 and 19, the pivotable perimeter frame 116 is pivotally attached to base perimeter frame 115 via an upper, generally horizontal hinge 117 at or partially along the upper frame portion 115a, and is pivotable via movement of a lower handle 119 at or partially along the lower frame portion 115c. Alternately, and as shown in FIGS. 17 and 20, the pivotable perimeter frame 116' of the window assembly 110' may be pivotally attached to the base perimeter frame 115' via a side hinge (not shown) and may be released and latched via a side handle or latch 119'. The sectional view of the window assembly 110' in FIG. 20 includes the handle 119' for a side hinge window assembly or module, but may be otherwise substantially similar to a sectional view through the side frame of window assembly 110 (except that the upper hinged window assembly 110 would not include such a handle 119'). The handles 119, 119' may function to engage and release a latching element 119a, 119a', that extends from the base perimeter frame 115, 115' at the lower region of the window assembly or the side region of the window assembly, respectively.

As can be seen in FIGS. 18-20, the base perimeter frame 115 may include a compressible or flexible seal or sealing member 126 (such as a Y-type seal or the like) for sealing against the pivotable perimeter frame 116 when the pivotable perimeter frame 116 is closed against the base perimeter frame 115. The pivotable perimeter frame 116 may have a similar outer or exterior surface as that of perimeter frame 16 described above, and may have the upper perimeter panel or frame portion 118a and side perimeter panel or frame portion 118b molded thereon, while the fixed window panel 112 is bonded or attached to the exterior surface of the pivotable perimeter frame 116 at the regions below the perimeter panel portion 118, such as in a similar manner as described above. The pivotable perimeter frame 116 may include a seal 134 at upper frame portion 116a for engaging and sealing against an upper edge or portion of the movable window panel 114 when the movable window panel 114 is closed, and may include a sliding seal 136 along side frame portions 116b for slidably engaging the movable window panel 114 as the movable window panel 114 is moved between its open and closed positions. The pivotable perimeter frame 116, 116', seals 134, 136, movable window panel 114 and fixed window panel 112 may be substantially similar to the corresponding components or elements of the window panel 10 described above, such that a detailed discussion of the window assemblies will not be repeated herein.

Figure 23:
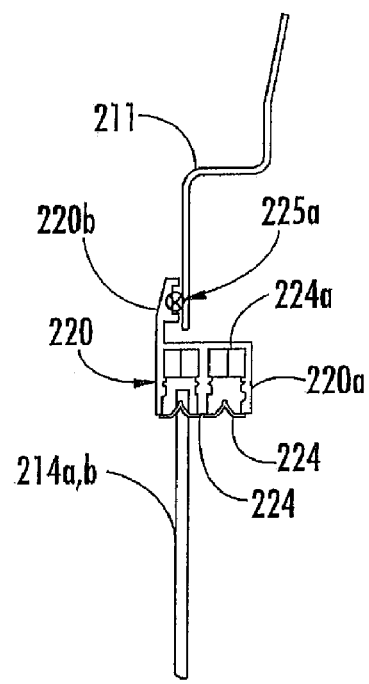
FIGS. 23-26 are sectional views of the driver side window assemblies of FIGS. 21 and 22.
Figure 24:
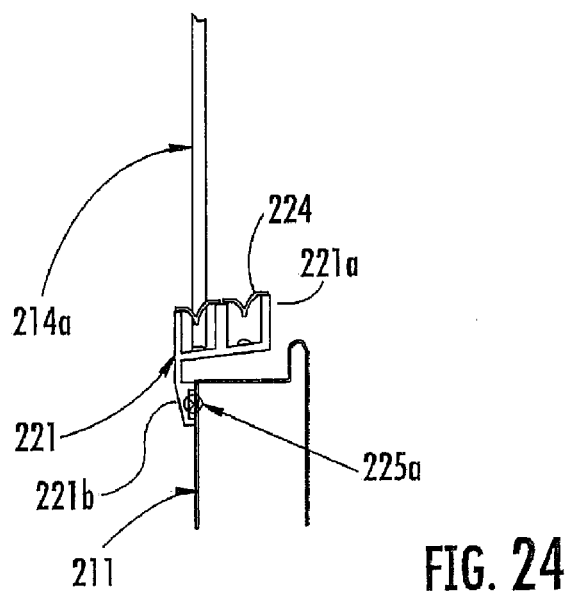

Optionally, and with reference to FIGS. 21-26, a window assembly 210 for a school bus 11 may include one or more horizontally sliding movable window panels 214a, 214b that are slidable or movable along an upper perimeter frame portion 220 and a lower perimeter frame portion 221 and between opposite side perimeter frame portions 222. The perimeter frame portions 220, 221, 222 each include a pair of channels 220a, 221 a, 222a for receiving a sealing member 224 therein for sealing against the perimeter edges of the window panels 214a, 214b. Optionally, and as shown in FIG. 23, the channels 220a of upper frame portion 220 may include filler strips 224a to facilitate removal of the window panels 214a, 214b from the perimeter frame of the window assembly, as desired.

Figure 25:
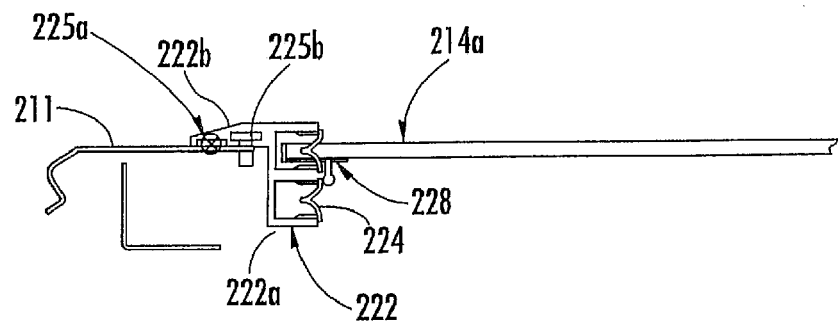
Figure 26:
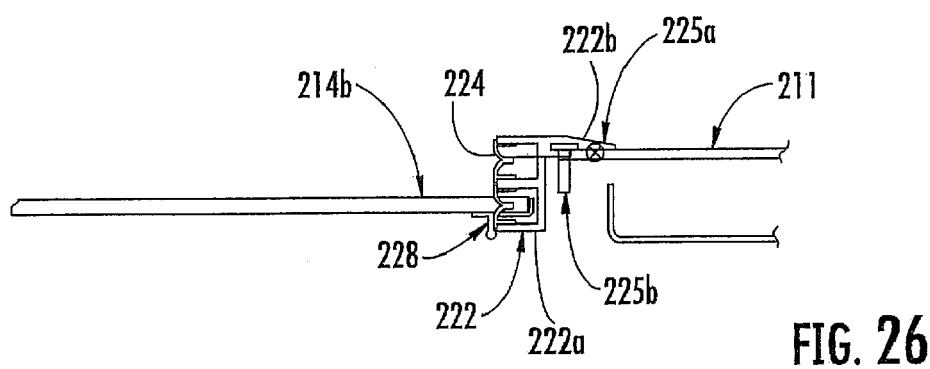
Figure 27:
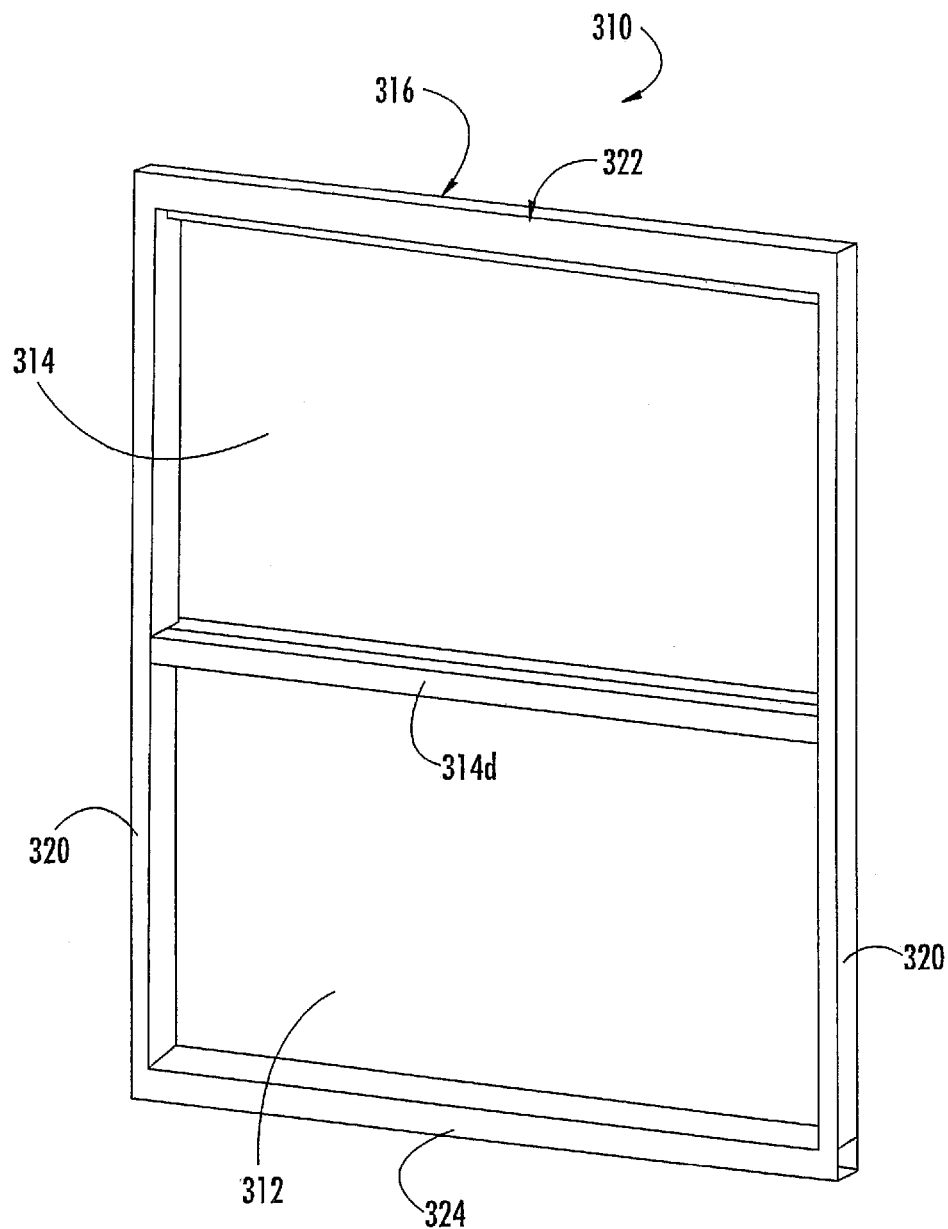
FIG. 27 is a perspective view of another window assembly of the present invention.

The perimeter frame portions 220, 221, 222 of window assembly 210 may also include an outer or exterior trim flange 220b, 221b, 222b, which may overlap the sheet metal 211 of the school bus at the outer perimeter of the window assembly to facilitate bonding or adhering or otherwise attaching or fastening (such as via a bead or layer of adhesive 225a and/or a fastener 225b) the perimeter frame portions 220, 221, 222 to the school bus from outside the school bus. The window assembly 210 and perimeter frame portions 220, 221, 222 and window panels and seals may be otherwise substantially similar to the window assembly 10 and corresponding components or elements described above, such that a detailed discussion of the window assemblies will not be repeated herein. As shown in FIGS. 25 and 26, a handle or grasping element 228 may be provided at the interior surface of the opposite edge portions of the movable window panels 214a, 214b to facilitate opening or sliding of the movable window panels 214a, 214b by a person from inside the school bus. Although not shown in FIGS. 21-26, one of the movable window panels 214a, 214b may have a sliding seal bonded or adhered to its surface for slidably engaging the opposed surface of the other movable window panel as the movable window panels are moved along the perimeter frame members, such as in a similar manner as described above with respect to sliding seal 26.

Figure 28:
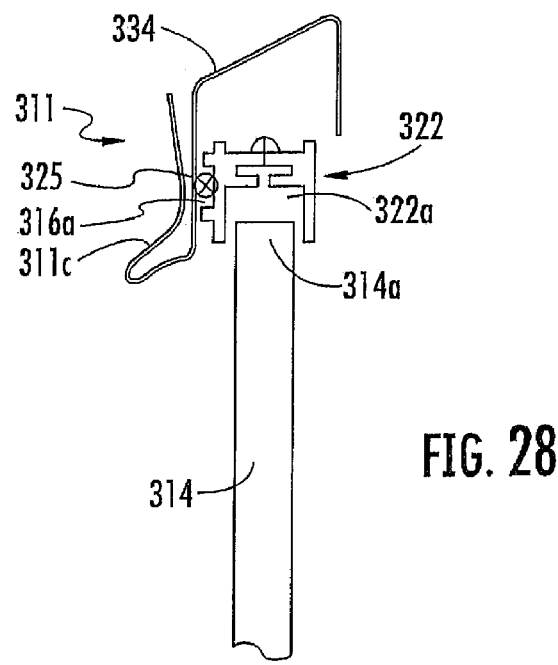
FIGS. 28-30 are sectional views of the window assembly of FIG. 27.
Figure 29:
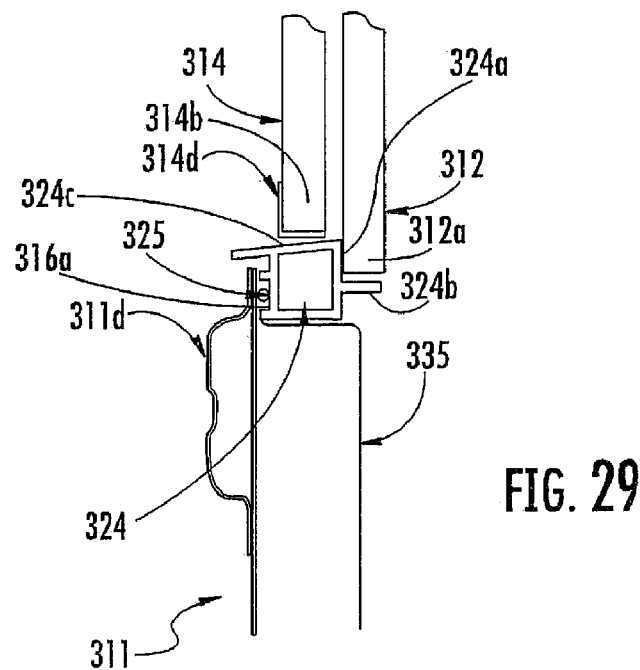

Although shown and described as a window assembly or module or window assemblies or modules for installation from the exterior of a school bus, aspects of the present invention may be suited for window assemblies that are installed or attached to the school bus from the interior of the school bus. For example, and with reference to FIGS. 27-30, a window assembly 310 for a school bus may include a fixed window panel 312 and a vertically sliding movable window panel 314 that is slidable or movable along side frame members 320 of a perimeter frame 316. The perimeter frame 316 includes an upper perimeter frame member 322 and a lower perimeter frame member 324. As can be seen with reference to FIGS. 28-30, window assembly 310 is attached to the school bus 311 from inside the school bus and is secured to the inside or interiorly facing surfaces of the sheet metal 334 and/or interior trim 335 of school bus 311. As shown in FIG. 29, fixed window panel 312 is positioned interiorly of movable window panel 314.

The perimeter frame 316 includes a surface or recess 316a from receiving a layer or bead of adhesive 325 therealong, whereby the perimeter frame 316 may be pressed against the interior surface of the sheet metal 334 and/or interior trim 335 of the school bus to attach the perimeter frame to the school bus (optionally fasteners or the like may also or otherwise be used to attach the perimeter frame to the school bus). As shown in FIG. 28, upper frame member 322 is attached at an interior side of the school bus and interiorly of the header or drip rail 311c of the school bus 311, while lower frame member 324 (FIG. 29) is attached at an interior side of the school bus and interiorly of a lip or flange of the rub rail 311d of the school bus 311. The side channels 320 (FIG. 30) are attached to the interior side of the school bus and interiorly of the bow cap 311b and generally adjacent to the vertical pillar or bow 311a of the school bus 311.

As shown in FIG. 28, upper perimeter frame member 322 includes a channel or track 322a for receiving an upper perimeter edge region 314a of movable window panel 314 when movable window panel 314 is substantially or completely closed. Although not shown in FIG. 28, the channel 322a may receive a sealing member or element (such as a flexible or compressible seal) to engage and substantially seal against the upper perimeter edge 314a of movable window panel 314 when the movable window panel is moved upwardly into the channel to close the window.

Figure 30:
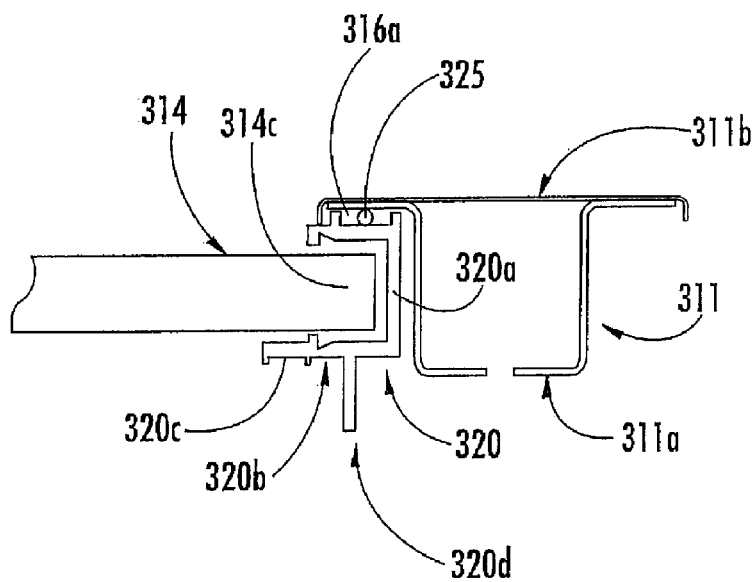

Similarly, and as shown in FIG. 30, side perimeter frame members 320 also include a channel or track 320a for slidably receiving the side perimeter edges 314c of movable window panel 314. Also, the channels 320a include a sliding seal or sealing member (not shown in FIG. 30) for substantially sealing against the side perimeter edges 314c of movable window panel 314. The side perimeter frame members 320 may include an interiorly facing surface 320b at which the fixed window panel 312 (not shown in FIG. 30) may be adhered or bonded or attached. In the illustrated embodiment, the interiorly facing surface 320b includes raised ribs or protrusions that define an adhesive receiving channel or track 320c for receiving a layer or bead of adhesive therealong for adhering to the exterior surface of the side perimeter regions of the fixed window panel 312. The side perimeter frame member 320 may also include a lip 320d that may extend partially along the side frame member and may provide a lip or flange along the side perimeter edge of the fixed window panel when the fixed window panel is adhered or attached to the surface 320b that also extends partially along the side perimeter frame member 320.

As shown in FIG. 29, lower perimeter frame member 324 includes an interior surface 324a at which the exterior surface of the lower perimeter edge region 312a of fixed window panel 312 may be bonded or adhered or attached. The lower perimeter frame member 324 also includes a lip or flange 324b that extends along the surface 324a and generally along and adjacent to the lower perimeter edge of the fixed window panel 312 when the fixed window panel is attached to the lower perimeter frame member 324. Lower perimeter frame member 324 includes an upper and outer surface 324c that is exterior of the fixed window panel 312 and that provides a sloped surface for water drainage and the like from the window assembly. In the illustrated embodiment, the surface 324c extends over the sheet metal and upper flange of the rub rail 311d of the school bus 311 to limit or substantially preclude water intrusion into the wall of the school bus at the lower portion of the window assembly.

In the illustrated embodiment, the lower perimeter edge region 314b of the movable window panel 314 includes a cover element or trim element 314d, which may be bonded or adhered along the lower perimeter edge of the window panel. The cover element 314d provides a finished appearance to the lower perimeter of the exterior movable window panel 314. Similarly, the fixed window panel 312 may include a cover element or trim element (not shown) at the upper perimeter edge region of the fixed window panel. The fixed window panel 312 also may include a sliding seal or sealing member (not shown in FIGS. 27-30, but may be similar to the sliding seal 26 described above) bonded or adhered to its exterior surface for engaging the interior surface of the movable window panel 314. Optionally, the perimeter frame 316 may include a cross frame member (not shown) extending across the window assembly and between the side perimeter frame members 320 and generally along the upper perimeter edge region of the fixed window panel, whereby the cross frame member may include a sliding seal for engaging the interior surface of the movable window panel.

Referring now to FIGS. 31-35, a driver's window assembly 410 for a school bus (such as at the driver side of the school bus and adjacent to the driver seat of the school bus) may include a perimeter frame 416 and one or more horizontally sliding movable window panels 414a, 414b that are slidable or movable along an upper perimeter frame member 420 and a lower perimeter frame member 421 and between opposite side perimeter frame members 422, such as similar to window assembly 210 discussed above. The perimeter frame 416 may comprise extruded perimeter frame members, such as extruded aluminum frame members or the like, which may be fastened or welded or otherwise joined at the corners of the perimeter frame 416 to define the generally rectangular frame of the window assembly 410. The perimeter frame 416 may be configured to be attached to the side of a school bus via adhesive and/or fasteners or the like, and may be attached from the exterior of the school bus.

Figure 33:
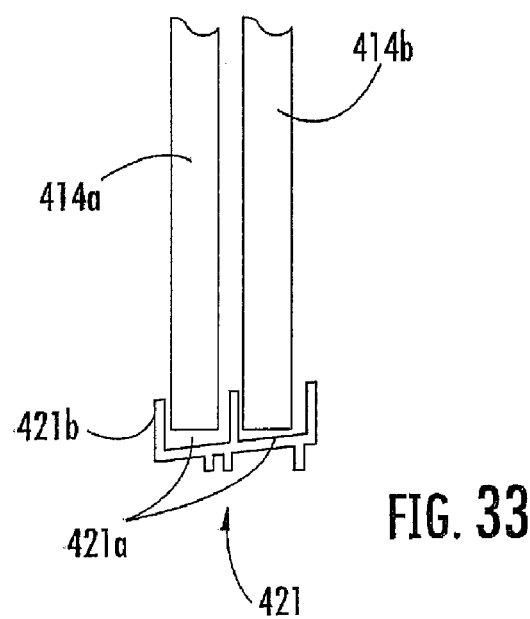
FIGS. 33-35 are sectional views of the driver side window assembly of FIGS. 31 and 32.
Figure 31:
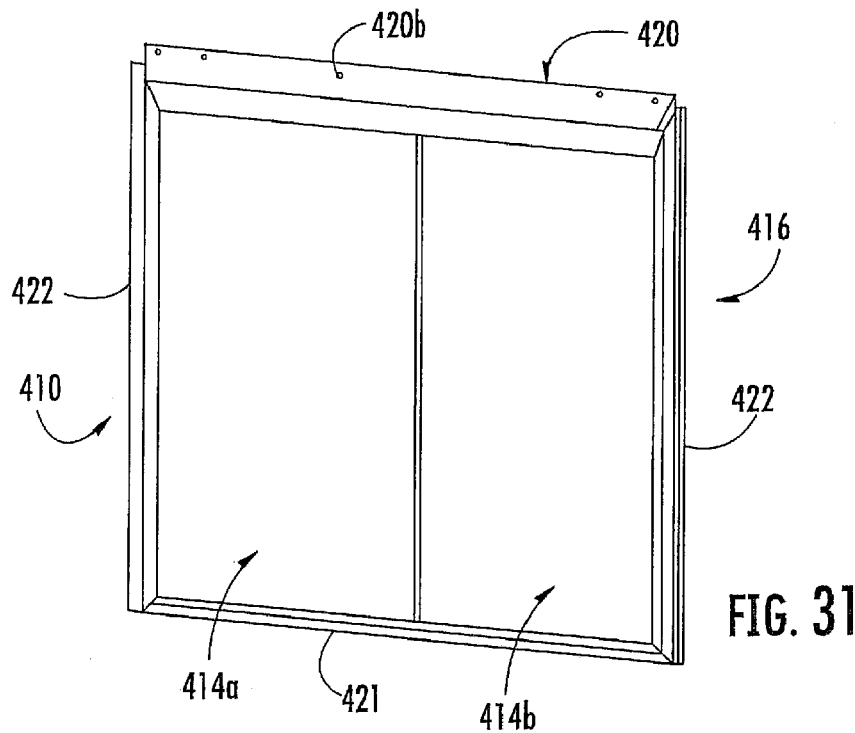
FIG. 31 is an exterior perspective view of another driver's window assembly of the present invention.
Figure 32:
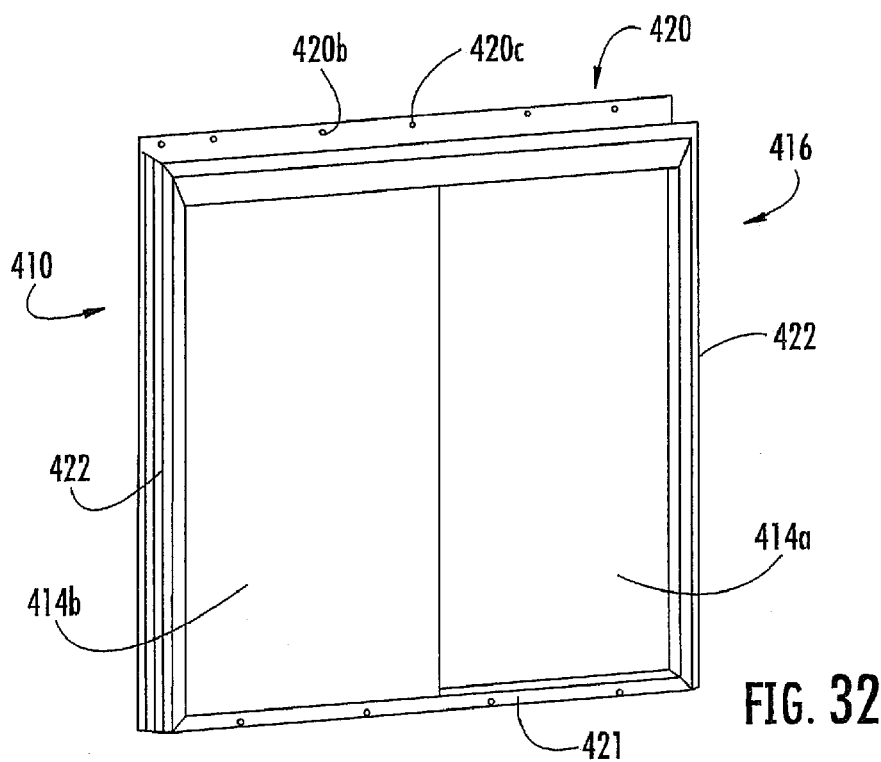
FIG. 32 is an interior perspective view of the driver side window assembly of FIG. 31.
Figure 34:
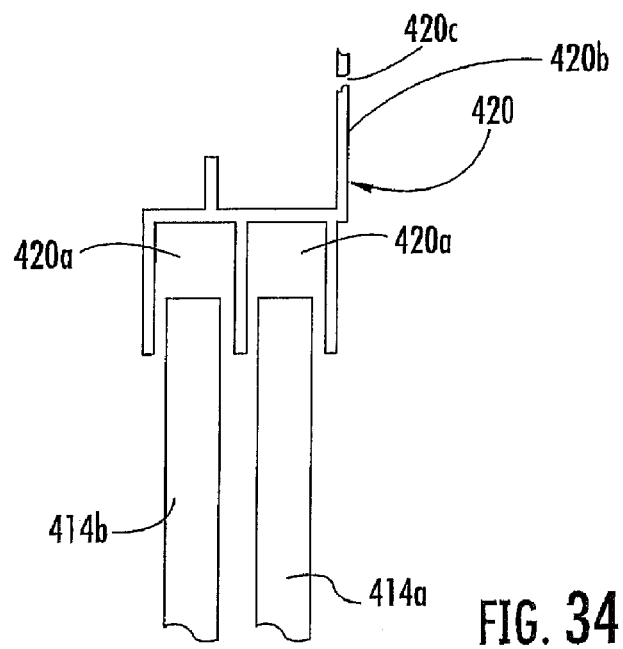
Figure 35:
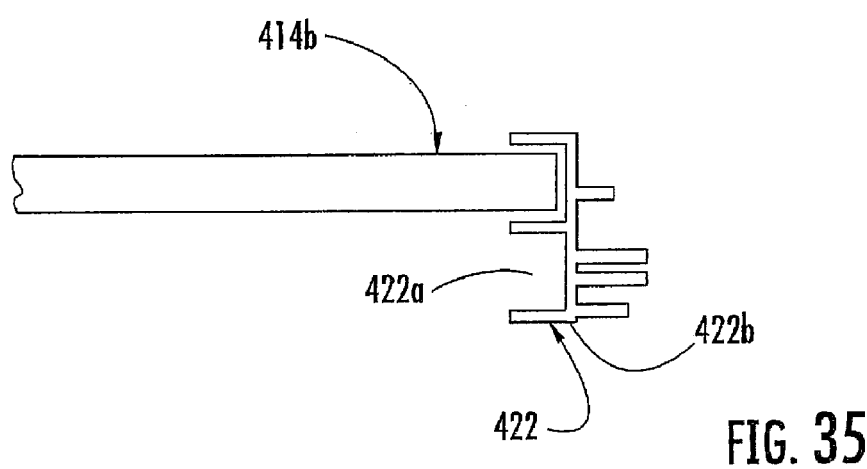

As shown in FIGS. 33-35, the perimeter frame members or channel members 420, 421, 422 each include a pair of channels 420a, 421a, 422a for receiving a sealing member (not shown) therein for sealing against the perimeter edges of the window panels 414a, 414b (such as movable storm glass panels or the like). The upper perimeter frame member 420 of window assembly 410 may also include an outer or exterior trim flange 420b, which may overlap the sheet metal of the school bus at the outer and upper perimeter of the window assembly (such as below the header or drip rail of the school bus) to facilitate bonding or adhering or otherwise attaching or fastening (such as via a bead or layer of adhesive and/or a plurality of fasteners, which may be inserted or screwed through fastener openings 420c) the perimeter frame member 420 to the school bus from outside the school bus. The other perimeter frame portions 421, 422 may also include an outer or exterior trim surface 421b, 422b to provide a finished exterior surface of the perimeter frame at the exterior of the school bus when the window assembly is attached to the school bus. The window assembly 410 and perimeter frame portions 420, 421, 422 and window panels 414a, 414b and seals may be otherwise substantially similar to the window assemblies and corresponding components or elements described above, such that a detailed discussion of the window assemblies will not be repeated herein.

Therefore, the present invention provides a window assembly or multiple window assemblies for installation at or attachment to the sides of a school bus. The window assemblies are modular window assemblies that may be readily attached to the school bus, and preferably from the outside of the school bus. The modular window assemblies of the present invention thus may be readily adhered or fastened or attached to the sheet metal of the school bus and between the vertical pillars or bows and bow caps of the school bus. When attached to the side of the school bus, the window assemblies provide a substantially flush exterior surface along the side of the school bus and, thus, provide an enhanced appearance to the school bus.

Changes and modifications to the specifically described embodiments may be carried out without departing from the principles of the present invention, which is intended to be limited only by the scope of the appended claims as interpreted according to the principles of patent law.

The invention claimed is:

1. A window module for a transit vehicle, said window module comprising:
    a frame configured to mount to a transit vehicle;
    a fixed window panel having an interior surface and an exterior surface, said fixed window panel being affixed to a portion of said frame;
    a perimeter panel having an interior surface and an exterior surface, said perimeter panel being secured to another portion of said frame, said perimeter panel comprising perimeter portions that cooperate to define an opening at said other portion of said frame;
    a movable window panel having an interior surface and an exterior surface;
    said frame comprising a pair of channel members for movably receiving said movable window panel, said movable window panel being slidably positioned at said frame such that a first perimeter edge of said movable window panel is slidably engaged with one of said channel members and a second perimeter edge of said movable window panel is slidably engaged with the other of said channel members;
    said movable window panel being movable along said channel members and interiorly of said fixed window panel when opened and interiorly of and generally at said perimeter panel when at least partially closed; and
    wherein said exterior surfaces of said fixed window panel and of said perimeter panel form a generally flush exterior surface at an exterior of the transit vehicle when said window assembly is installed at the transit vehicle.

2. The window module of claim 1 further comprising a resilient seal along said channel members to reduce leakage between said movable window panel and said frame.

3. The window module of claim 2 further comprising a resilient sliding seal that is secured to said interior surface of said fixed window panel and at a perimeter region of said fixed window panel that is at or near said opening defined by said perimeter panel, said resilient sliding seal slidably engaging said exterior surface of said movable window panel as said movable window panel is opened and closed.

4. The window module of claim 1, wherein said window module is pivotally mounted to a fixed frame that is configured to be fixedly attached to a transit vehicle.

5. The window module of claim 1, wherein said window assembly is configured to be installed at the exterior sheet metal of a school bus and from a location outside of the school bus.

6. The window module of claim 1, wherein said channels are generally vertically oriented when said window module is installed at the transit vehicle.

7. The window module of claim 1, wherein said channels are generally horizontally oriented when said window module is installed at the transit vehicle.

8. The window module of claim 7, wherein said window module includes two movable window panels that are slidably movable along said frame.

9. The window module of claim 1, wherein said frame is configured to be adhesively mounted to the transit vehicle.

10. The window module of claim 1, wherein said perimeter panel comprises an upper portion, a lower portion and opposite side portions that cooperate to define said opening at said other portion of said frame.

11. A method of installing a window module at a transit vehicle, said method comprising:
    providing a window module comprising a frame, a fixed window panel having an interior surface and an exterior surface, a perimeter panel having an interior surface and an exterior surface, and a movable window panel having an interior surface and an exterior surface, said fixed window panel being affixed to a portion of said frame, said perimeter panel being secured to another portion of said frame, said perimeter panel comprising perimeter portions that cooperate to define an opening at said other portion of said frame, said movable window panel being slidably positioned at said frame such that a first perimeter edge of said movable window panel is slidably engaged with a first channel member of said frame and a second perimeter edge of said movable window panel is slidably engaged with a second channel member of said frame, said movable window panel being movable along said channel members and interiorly of said fixed window panel when opened and interiorly of and generally at said perimeter panel when at least partially closed;
    attaching said window module to a sheet metal frame of the transit vehicle from outside of the transit vehicle, said window module engaging and attaching to an exterior surface of the sheet metal frame of the transit vehicle when attached from the outside of the vehicle; and
    wherein said exterior surfaces of said fixed window panel and of said perimeter panel form a generally flush exterior surface at an exterior of the transit vehicle when said window assembly is attached at the exterior surface of the sheet metal frame of the transit vehicle.

12. The method of claim 11, wherein attaching said window module to a sheet metal frame of the vehicle from outside of the vehicle comprises attaching said window module to a sheet metal frame of a school bus from outside of the school bus.

13. The method of claim 11, wherein providing a window module comprises providing a plurality of window modules, and wherein attaching said window module comprises attaching said plurality of window modules to a sheet metal frame along a side of the vehicle from outside of the vehicle.

14. The method of claim 11, wherein attaching said window module to a sheet metal frame of the vehicle from outside of the transit vehicle comprises adhesively attaching said window module to a sheet metal frame of the transit vehicle from outside of the vehicle.

15. The method of claim 11, wherein providing a window module comprises providing a window module having a resilient seal along said channel members to reduce leakage between said movable window panel and said frame.

16. The method of claim 15, wherein providing a window module comprises providing a window module having a resilient sliding seal secured to said interior surface of said fixed window panel and at a perimeter region of said fixed window panel that is at or near said opening defined by said perimeter panel, said resilient sliding seal slidably engaging said exterior surface of said movable window panel as said movable window panel is opened and closed.

17. The method of claim 11, wherein said channels are generally vertically oriented when said window module is installed at the vehicle.

18. The method of claim 11, wherein said channels are generally horizontally oriented when said window module is installed at the vehicle.

19. The method of claim 18, wherein providing a window module comprises providing a window module having said frame pivotally mounted at a fixed frame, and wherein attaching said window module to a sheet metal frame of the transit vehicle comprises attaching said fixed frame of said window module to a sheet metal frame of the transit vehicle.

20. The method of claim 11, wherein said perimeter panel comprises an upper portion, a lower portion and opposite side portions that cooperate to define said opening at said other portion of said frame.

\* \* \* \* \*

UNITED STATES PATENT AND TRADEMARK OFFICE
CERTIFICATE OF CORRECTION

PATENT NO. : 7,427,096 B2  
APPLICATION NO. : 11/584698  
DATED : September 23, 2008  
INVENTOR(S) : Darlin J. Snider and Michael J. Hulst Page 1 of 1

It is certified that error appears in the above-identified patent and that said Letters Patent is hereby corrected as shown below:

Column 6:
Line 45, "movable" should be --fixable--.

Column 10:
Line 47, "221 a" should be --221*a*--.

Column 12:
Line 58, "comers" should be --corners--.

Signed and Sealed this

Twenty-fourth Day of November, 2009

David J. Kappos
*Director of the United States Patent and Trademark Office*